(12) United States Patent
Mencher et al.

(10) Patent No.: US 9,709,144 B2
(45) Date of Patent: Jul. 18, 2017

(54) START-UP ELEMENT WITH TORSIONAL VIBRATION DAMPER AND VIBRATION DAMPER

(71) Applicant: ZF FRIEDRICHSHAFEN AG, Friedrichshafen (DE)

(72) Inventors: Georg Mencher, Grafenrheinfeld (DE); Peter Hammer, Schweinfurt (DE); Stojan Cegar, Waigolshausen (DE); Ralph Fambach, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 127 days.

(21) Appl. No.: 14/417,045

(22) PCT Filed: Jun. 25, 2013

(86) PCT No.: PCT/EP2013/063267
§ 371 (c)(1),
(2) Date: Jan. 23, 2015

(87) PCT Pub. No.: WO2014/016071
PCT Pub. Date: Jan. 30, 2014

(65) Prior Publication Data
US 2015/0192194 A1    Jul. 9, 2015

(30) Foreign Application Priority Data
Jul. 25, 2012  (DE) .................. 10 2012 213 015

(51) Int. Cl.
*F16F 15/134*    (2006.01)
*F16F 15/14*     (2006.01)
*F16H 45/02*     (2006.01)

(52) U.S. Cl.
CPC ....... *F16H 45/02* (2013.01); *F16F 15/13484* (2013.01); *F16F 15/145* (2013.01);
(Continued)

(58) Field of Classification Search
CPC ... F16F 15/13484; F16F 15/145; F16D 45/02; F16H 2045/021; F16H 2045/0226; F16H 2045/0231; F16H 2045/0284
See application file for complete search history.

(56) References Cited

U.S. PATENT DOCUMENTS 6,244,401 B1 * 6/2001 Maienschein ........... F16H 45/02
                                                   192/213.1
9,140,348 B2 * 9/2015 Heuler .................. F16F 15/145
(Continued)

FOREIGN PATENT DOCUMENTS

DE    100 17 801    10/2001
DE    103 58 902     6/2005
(Continued)

*Primary Examiner* — Terry Chau
(74) *Attorney, Agent, or Firm* — Cozen O'Connor (57) ABSTRACT

A starting element has a torsional vibration damper coupleable with a drive with a drive-side input element rotatable against an action of a first spring element and a driven-side output component rotatable against the action of a second spring element arrangement around an axis of rotation. The driven-side output component is coupled with an output of the starting element. A hydrodynamic coupling device has a turbine and a turbine flange connected therewith fixed with respect to rotation. The turbine flange is coupled with the output to be fixed with respect to rotation a first connection. A tuned mass damper a mass damper support element coupled with an intermediate transmission arrangement by a second mechanical connection. The mass damper support element extends opposite to a radial direction perpendicular to the axis of rotation to a component of the output.

18 Claims, 3 Drawing Sheets

(52) U.S. Cl.
CPC .......... *F16H 2045/021* (2013.01); *F16H 2045/0226* (2013.01); *F16H 2045/0263* (2013.01); *F16H 2045/0284* (2013.01)

(56) References Cited

U.S. PATENT DOCUMENTS

| | | | |
|---|---|---|---|
| 9,175,760 B2* | 11/2015 | Mencher | F16H 45/02 |
| 2010/0236228 A1* | 9/2010 | Degler | F16F 15/145 |
| | | | 60/338 |
| 2011/0031083 A1* | 2/2011 | Matsuoka | F16H 45/02 |
| | | | 192/3.29 |
| 2011/0287844 A1 | 11/2011 | Steinberger | |
| 2012/0080280 A1 | 4/2012 | Takikawa et al. | |
| 2015/0354684 A1* | 12/2015 | Lee | F16F 15/12 |
| | | | 192/3.29 |

FOREIGN PATENT DOCUMENTS

| | | |
|---|---|---|
| DE | 100 39 635 | 6/2007 |
| DE | 10 2007 053 333 | 6/2008 |
| DE | 10 2008 056 636 | 7/2009 |
| DE | 10 2010 014674 | 11/2010 |
| WO | WO 2007/054060 | 5/2007 |

\* cited by examiner

START-UP ELEMENT WITH TORSIONAL VIBRATION DAMPER AND VIBRATION DAMPER

CROSS REFERENCE TO RELATED APPLICATION

This is a U.S. national stage of application No. PCT/EP2013/063267, filed on Jun. 25, 2013. Priority is claimed on German Application No. DE102012213015.2 filed Jul. 25, 2012, the content of which is incorporated herein by reference.

BACKGROUND OF THE INVENTION

1. Field of the Invention

The present invention is directed to starting elements, particularly a starting element having a hydrodynamic coupling element comprising a torsional vibration damper and a tuned mass damper.

2. Detailed Description of Prior Art

Starting elements for transmitting a torque from a drive unit to a downstream drivetrain such as a transmission are known in a variety of embodiments. Hydrodynamic coupling elements, i.e., hydrodynamic circuits without torque conversion (hydroclutches) or with torque conversion (hydrodynamic torque converters), are often used for enabling automatic starting. To increase energy efficiency after starting, they are mechanically locked up in a so-called lockup mode by converter lockup clutches to prevent flow losses and to optimize consumption of fuel or driving energy.

Starting elements or starting converters of this kind are often combined with torsional vibration dampers, which can comprise one or more stages and have a drive-side input element that can be connected to a rotating drive unit to be fixed with respect to rotation relative to it. Located between this input element and a driven-side output component are one or more energy accumulators or spring elements, for example coil springs, which can serve to suppress vibrations in the drivetrain. Accordingly, the torque is transmitted from the input component of the torsional vibration damper, via the energy-accumulating or vibration-damping elements, to the output component, which is connected to the output of the starting element so as to be fixed with respect to rotation relative to it. In general, a drive-side component is a component or assembly which, with respect to the flow of power from the driving unit to the end of the drivetrain, is located closer to the driving unit than a component designated as being on the driven side. In order to improve the damping action in two-stage torsional vibration dampers, the drive-side input element is initially connected via a first spring element arrangement to an intermediate transmission arrangement which is in turn connected via a second spring element arrangement to the output component of the torsional vibration damper.

Further, tuned mass dampers, as they are called, are also installed for further enhancement of driving comfort and further suppression of vibrations in the drivetrain, particularly with locked-up converter or locked-up hydrodynamic coupling element. Generally speaking, tuned mass dampers, or mass dampers, are additional masses coupled with the drive system or torsional vibration damper by a spring system. For example, a tuned mass damper operates on the principle that a vibratory system comprising a main mass and an additional mass is so tuned with respect to its natural frequency that at a certain excitation frequency the additional mass, referred to hereinafter as damper weight, carries out a forced vibration, while the main mass remains at rest so that vibration frequencies of this kind can be efficiently suppressed.

To achieve suppression of vibrations over a larger range of rotational speeds, speed-adaptive tuned mass dampers, or mass dampers, are used whose natural frequency or resonant frequency changes as a function of rotational speed, for example, proportional to the rotational speed. Thus by tuned mass damper is meant herein a device or mechanism or arrangement of components by means of which no torque is transmitted and which is capable of removing energy from the drivetrain at a determined, possibly variable, vibration frequency in order to suppress torsional vibrations occurring at this frequency.

A substantial challenge consists in arranging a plurality of such components or assemblies in a starting element in an efficient and space-saving manner such that the range of forces acting dynamically on the individual components can be absorbed.

SUMMARY OF THE INVENTION

According to one embodiment of the present invention, a starting element has a two-stage torsional vibration damper, a hydrodynamic coupling device and a tuned mass damper. The hydrodynamic coupling device and tuned mass damper are connected to the rest of the components, e.g., the torsional vibration damper, in an advantageous manner with respect to installation space and so as to reliably support all occurring torques. The torsional vibration damper has a drive-side input element that is rotatable with respect to an intermediate transmission arrangement around an axis of rotation against an action of a first spring element arrangement, this intermediate transmission arrangement being in turn rotatable with respect to a driven-side output component against the action of a second spring element arrangement. This driven-side output component is coupled with an output of the starting element to be fixed with respect to rotation relative to it.

The hydrodynamic coupling device, which can be a hydrodynamic torque converter or hydroclutch, has a turbine and a turbine flange connected to the turbine to be fixed with respect to rotation relative to it and which is coupled with the output so as to be fixed with respect to rotation relative to it via a first mechanical connection. The tuned mass damper comprises at least one damper weight carried by a mass damper support element, and the mass damper support element is coupled with the intermediate transmission arrangement to be fixed with respect to rotation relative to it via a second mechanical connection, and the mass damper support element extends to a component of the output opposite to a radial direction perpendicular to the axis of rotation. The weight of the tuned mass damper is supported radially inwardly on a component of the output, for example of a driven hub, via the mass damper support so that torques caused by the occasionally substantial masses of the damper weights can be reliably supported even in case of limited play in the bearings in the starting element without leading to increased wear.

According to one embodiment of the present invention, the turbine flange is additionally linked to the rest of the elements of the starting element by a different mechanical connection than the tuned mass damper. This makes it possible in particular to couple the tuned mass damper with the intermediate transmission arrangement of the torsional vibration damper, which can be advantageous with respect to the efficiency of the tuned mass damper, and at the same time to couple the hydrodynamic coupling device with the output while bypassing the torsional vibration damper, which can be advantageous in terms of power in converter mode. This can be achieved in such a way that the large masses linked to the torsional vibration damper or intermediate transmission arrangement thereof do not lead to a transmission of tilting moments to the torsional vibration damper resulting in increased wear, since the mass damper support element extends radially up to a component of the output such that it is supported thereon. In other words, any large imbalances that may occur can be efficiently suppressed because the tuned mass damper can be supported on the outer diameter of the driven hub via the center bore of its mass damper support element. Otherwise, an imbalance of this kind could occur on principle because, in order to achieve a corresponding damping effect, tuned mass dampers have damper weights with substantial inherent weight and, in case of extensive play or wear at bearing points and/or with an unfavorable arrangement of bearing points, could otherwise cause very great imbalances that would in turn manifest themselves as unwanted influences in the drivetrain.

Alternatively, in configurations of tuned mass dampers having two or more mass damper support elements within the meaning described above, a plurality of mass damper support elements, or all of the mass damper support elements, can be lengthened radially inward up to the driven hub to be supported thereon.

An extremely compact constructional shape of the starting element can be achieved by a radially staggered connection between turbine and output and between tuned mass damper and the intermediate transmission arrangement of the torsional vibration damper.

The tuned mass damper can be arranged radially outward of the turbine flange of the turbine by means of which the turbine is fastened to the driven hub such that no additional installation space is needed in radial direction and the available space in axial direction can also be utilized to the fullest extent. The installation space that is required by the turbine flange in the axial direction can be used to arrange the tuned mass damper radially outward of the turbine flange. In particular, this makes it possible to arrange the tuned mass damper in the axial direction parallel to the axis of rotation between the torsional vibration damper and the turbine of the hydrodynamic converter in an extremely space-saving manner.

A particularly space-saving arrangement can be achieved when the first mechanical connection and the second mechanical connection are radially staggered, i.e., the center points thereof are located at different radial distances from the axis of rotation and both mechanical connections are located radially inside of the second spring element arrangement of the torsional vibration damper.

In one embodiment of the present invention, the intermediate transmission arrangement comprises at least one drive-side cover plate that extends opposite to the radial direction into a retaining area between the driven hub and a guide bush adjacent to the driven hub opposite the axial direction. This bearing has play, i.e., the cover plate can move to a predetermined extent relative to the guide bush and driven hub in the axial direction and opposite to the axial direction and, after the maximum play predetermined by the construction has been exceeded, the movement of the cover plate in or opposite to the axial direction is inhibited within the retaining area either by the driven hub or by the guide bush. This means that the drive-side cover plate, which is part of the intermediate transmission arrangement of the torsional vibration damper is prevented from moving in the axial direction and opposite to the axial direction so that axial forces can be reliably supported on the torsional vibration damper.

According to a one embodiment, the driven hub has in the retaining area a stop surface for the cover plate that extends parallel to the latter and forms a bearing support for the drive-side cover plate so that in case the cover plate must be supported by the driven hub only minor wear can occur between the cover plate and driven hub.

According one embodiment, the intermediate transmission arrangement has a driven-side cover plate arranged on the side of the drive-side cover plate axially opposed to the output component and is connected thereto at a fixed distance. In so doing, the driven-side cover plate extends opposite to the radial direction up to the driven hub so as to be radially supported on the latter and accordingly ensures a further improved support of the torsional vibration damper relative to tilting moments.

By output component of the torsional vibration damper in the sense employed above is meant herein the final component of the torsional vibration damper on the output side where torque is transmitted from the torsional vibration damper to the subsequent components. In particular, the driven hub can also be understood as a component of this type and can generally also be understood to mean an element at which the torque or the rotation can be transferred from the starting element to downstream subassemblies, for example, gear units or the like. Typical embodiment examples of driven hubs of this type have an inner toothing into which the externally toothed shaft can be inserted to transmit torque.

A hydroclutch, i.e., a hydrodynamic circuit without additional torque conversion as well as a hydrodynamic torque converter with a stator system, i.e., a hydrodynamic circuit with additional torque conversion, can be used as hydrodynamic coupling device employed in a starting element.

According to some embodiment, the output component of the torsional vibration damper is coupled with the output via the same first mechanical connection by which the turbine flange of the hydrodynamic converter is also coupled with the driven hub. This contributes to a particularly compact construction. In particular, two separate rivet connections or other types of mechanical connection between the turbine and the torsional vibration damper or the output component thereof can be avoided in this way.

According to one embodiment of the invention, the first mechanical connection and the second mechanical connection at least partially overlap in axial direction. This means that when the first mechanical connection and second mechanical connection is a rivet connection or screw connection or a similar axially extending connection the axial extension of the first mechanical connection and second mechanical connection overlaps, which can lead to a particularly compact type of construction with a small axial extension of the starting element.

According to one embodiment of the invention, the driven hub has a fastening flange which extends in radial direction and by which the turbine flange of the turbine is in turn connected via the first mechanical connection.

According to one embodiment of the present invention, a pressure plate is located on the side of the turbine flange opposing the fastening flange in axial direction, this pressure plate extends opposite the radial direction directly to the driven hub such that it can be supported on the latter and can accordingly absorb tilting moments. According to one embodiment, the turbine flange extends with play between the pressure plate and the driven hub such that when a play between the turbine flange and pressure plate is exceeded the pressure plate helps to reduce loading of the first mechanical connection formed, e.g., by rivets, since the axial load can be received in this case not only by the rivets of the rivet connection but also by contact of the turbine flange at the pressure plate.

This can reduce the mechanical load on the first mechanical connection, i.e., for example on rivets used therein, on which very high stresses can act in critical operating situations.

According to one embodiment the pressure plate has a contact surface on the side remote of the turbine flange for a thrust bearing which is formed to serve as a race for a rolling element bearing or as a sliding surface of a plain bearing. This means that the pressure plate itself can be supported axially by a rolling element bearing or a plain bearing to provide the contact surface for the turbine flange which guarantees stability.

According to one embodiment of the invention, the pressure plate has on the side facing the turbine flange a circumferential groove or a plurality of recesses for receiving rivet heads so that during contact at the turbine flange the rivet heads of the rivet connection which may possibly be located at the latter are not damaged.

According to one embodiment, the pressure plate is secured against a rotation relative to the driven hub and/or the turbine flange to prevent further material fatigue due to a relative movement between the turbine flange and pressure plate. According to one embodiment, the turbine flange of the turbine can be clamped between two components, namely, the pressure plate and the driven hub, by the pressure plate, which can likewise contribute to reducing the load on the first mechanical connection and increases the operating life and reliability of the starting element overall.

In general, a first mechanical connection or second mechanical connection within the meaning described above can be any type of positive engagement, frictional engagement, or bonding engagement. In this context, a positive engagement means that a connection preventing the components connected to one another from moving relative to one another in at least one connection direction is brought about in that the geometry of the components used for the connection is so selected that these components intersect in a direction perpendicular to the connection direction so as to prevent movement in the connection direction in this way. Frictional engagement in this context means that a connection preventing the components connected to one another from moving relative to one another in at least one connection direction is brought about by a force acting between the components perpendicularly to the connection direction, which force leads, for example, to increased cohesive forces or adhesive forces. Accordingly, a frictional engagement persists as long as a force brought about between the components by static friction is not exceeded. Bonding engagement in this context means that a connection preventing the components connected to one another from moving relative to one another in at least one connection direction is brought about by atomic or molecular forces. In so doing, the materials of the connected components can blend at least partially at an interface. This need not take place exclusively between the materials of the connected components alone. Rather, a material component which brings about or assists in the blending, for example, an adhesive or a material of a welding wire, can be provided additionally so that a plurality of materials are blended together at the interface on a microscopic scale.

BRIEF DESCRIPTION OF THE DRAWINGS

Preferred embodiment examples of the present invention will be described in more detail in the following with reference to the accompanying drawings. In the drawings.

DETAILED DESCRIPTION OF THE PRESENTLY PREFERRED EMBODIMENTS

Exemplary embodiment examples will now be described with reference to the accompanying drawings. It will be noted in advance that the figures are not necessarily drawn to scale and that certain components can be highlighted artificially through the use of a different line thickness or shading to emphasize certain features or characteristics.

It is explicitly noted that further embodiment examples are not to be limited by the specific implementations shown in the following figures. In particular, the fact that certain functionalities in the following figures are described in relation to specific entities, specific functional blocks or specific devices should not be construed to the effect that these functionalities should be, or even must be, allocated in the same manner in further embodiment examples. In further embodiment examples, certain functionalities which are associated in the following with separate components or units may be comprised in a single component or in a single functional element or can be carried out herein as functionalities which are combined in a single element or by a plurality of separate component parts.

It is further noted that when a specific element or component part is referred to as connected, coupled or linked to another element it is not necessarily meant that it is connected, coupled or linked directly to the other component part. When this is meant, it is explicitly noted by stating that the element is directly connected, directly coupled or directly linked to the further element. This means that no intermediate further element is provided which imparts an indirect coupling or connection or link. Further, identical reference numerals in the following figures denote identical components, components which function identically or components which function similarly, i.e., which are interchangeable by way of substitution between the different exemplary embodiments described in the following. Therefore, for a detailed description of a component part such as this which is shown in a figure, reference may also be had to the description of the component part or component element in another figure corresponding to that component part.

Figure 1:
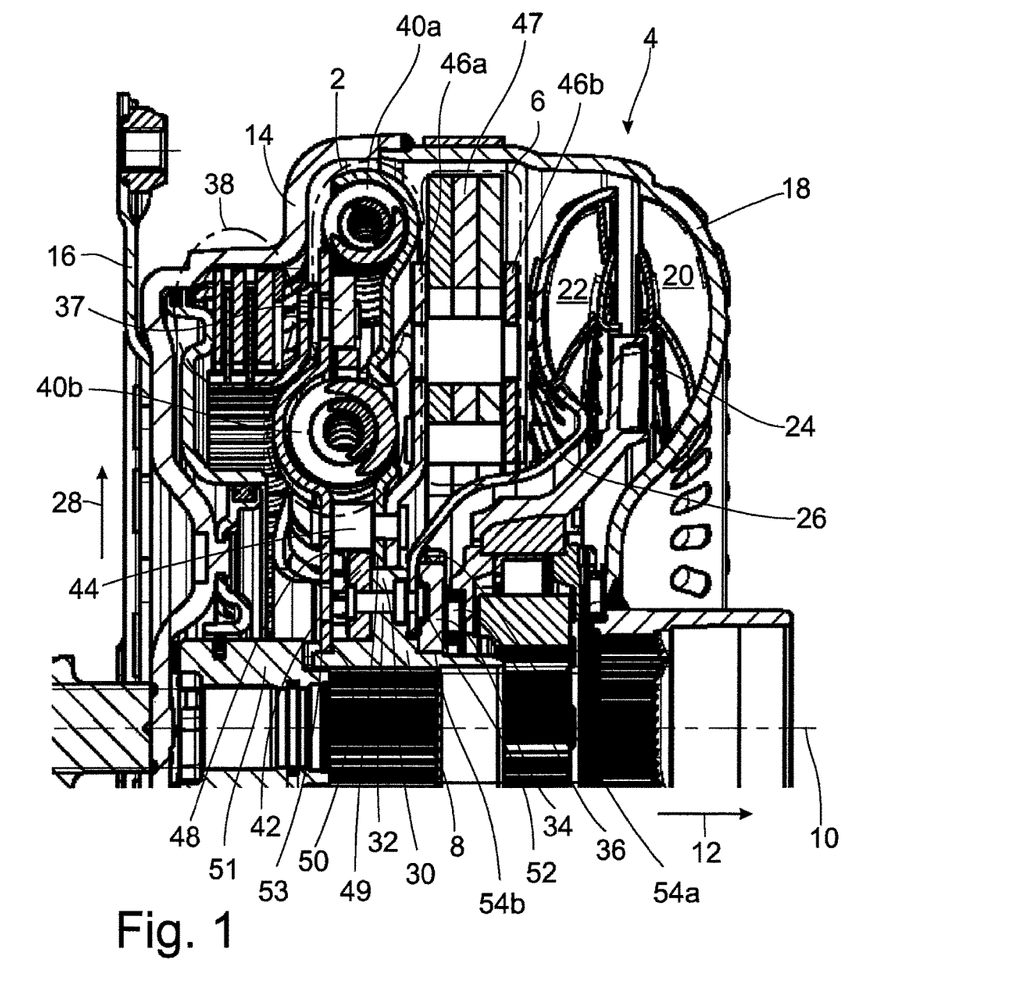
FIG. 1 is a section through one half of a starting element according to the present invention.

FIG. 1 shows an embodiment example of a starting element comprising a torsional vibration damper 2, a hydrodynamic starting converter as hydrodynamic coupling device 4 and a tuned mass damper 6. A driven hub 8 forming an output of the starting element has an inner toothing into which, for example, an input shaft of a transmission can be fitted so that torque or rotation transmitted by the starting element can be transmitted to a driven side.

During operation, the driven hub 8 rotates around an axis of rotation 10 along which the substantially rotationally symmetric starting element extends in an axial direction 12 parallel to the axis of rotation 10. The connection to a drive is carried out via a drive-side housing half, i.e., the converter cover 14, which is connected via flexible plates 16 to a drive unit, not shown for the sake of simplicity, for example, a combustion engine or electric motor. The engine-side converter cover 14 is welded to a transmission-side housing part or driven-side housing part, i.e., the impeller shell 18, which has at its axial end, as part of the hydrodynamic converter circuit, impeller blades 20 by which a hydraulically active liquid is conveyed in direction of turbine blades 22 of the hydrodynamic converter when the housing is set in rotation by the flexible plates 16.

In the present case, the hydrodynamic converter 4 is a hydrodynamic torque converter and, therefore, further has a stator device 24 that closes the hydraulic circuit between the impeller blades 20 and turbine blades 22. The turbine is connected via a turbine flange 26 to the driven hub 8 so as to be fixed with respect to rotation relative to it in order to transmit the rotation of the turbine blades 22. More precisely, the driven hub 8 has a fastening flange 30 extending therefrom in a radial direction 28 perpendicular to the axial direction 12, which fastening flange 30 is connected to the turbine flange 26 of the turbine so as to be fixed with respect to rotation relative to it by a first mechanical connection 32 in the form of rivets.

To improve the stability of the connection, an annular pressure plate 34 is arranged on the side of the turbine flange 26 opposite to the fastening flange 30 in axial direction 12. The pressure plate 34 extends opposite the radial direction 28 to the driven hub 8 so as to be supported at the driven hub 8. In addition, the pressure plate is radially centered and fixed in this way.

Support at the driven hub 8 allows tilting moments relative to the axial direction 12 to be reliably absorbed by the pressure plate. The turbine flange 26 is riveted to the driven hub 8 and extends radially inward with play with respect to the pressure plate 34. That is, a play between the pressure plate 34 and the turbine flange 26 allows a slight compensation of an axial play between these two elements. After play is compensated, however, the turbine flange 26 can make contact with the pressure plate 34 to prevent overexpansion of the rivets 32 and, therefore, failure of the driving element due to overloading in that the stability of the connection between the turbine flange 26 and fastening flange 30 of the driven hub 8 is increased. The pressure plate 34 itself is axially supported on the side remote of the turbine flange 26 by rolling element bearing 36 so as to ensure a strengthening of the connection of the turbine flange 26 to the driven hub 8 in spite of the pressure plate 34 being arranged with play with respect to the turbine flange 26.

Figure 3:
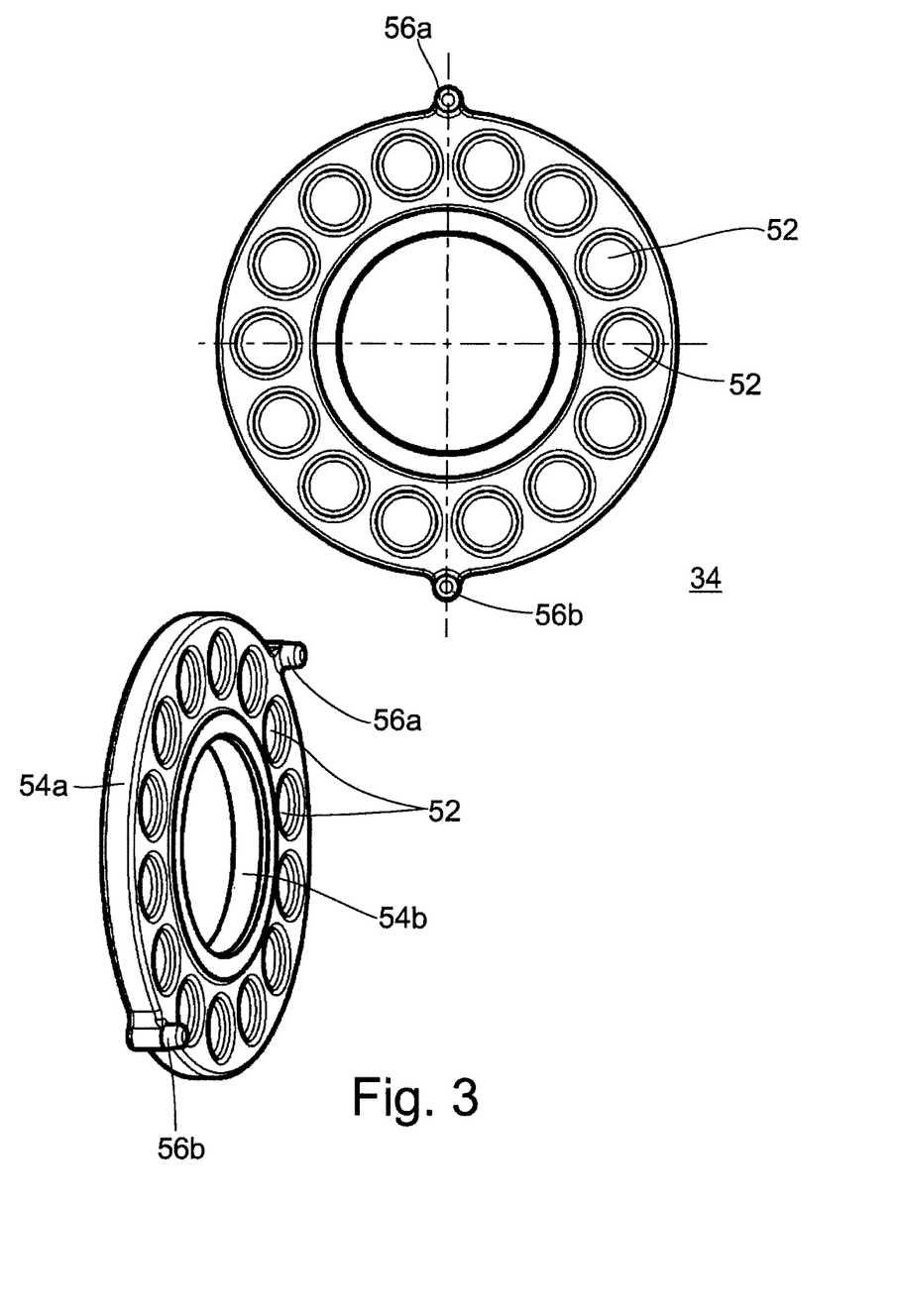
FIG. 3 is a view of a pressure plate for use in FIGS. 1 and 2.

Accordingly, the pressure plate 34 shown in detail in FIG. 3 can stabilize the rivet connection of turbine flange 26 and driven hub 8, which can be particularly critical with respect to the occurrence of wear. In particular, high tensile stresses, which could lead to failure of the connection, may occur at the rivets 32 in critical operating situations. The loading of the rivet connection can be significantly reduced through an axial support of the turbine in the axial direction 12 by the pressure plate 34, which increases the operating stability and reliability.

The back side of the pressure plate 34, i.e., the side of the pressure plate 34 remote of the turbine flange 26, is formed in the embodiment example shown in FIG. 1 as a race for a rolling element bearing 36 by which the pressure plate 34 is supported in axial direction 12 at the hub of the stator device 24 so that a force supporting the rivets 32 can be exerted on the turbine flange 26 via the rolling element bearing 36 and via the pressure plate 34 opposite the axial direction. In alternative embodiment examples, a plain bearing can also be used instead of the thrust bearing or rolling element bearing 36. Of course, if rolling element bearings are used, any type of bearing may be considered, for example, conical roller bearings, cylindrical roller bearings, barrel roller bearings, or thrust needle bearings. The individual rolling elements may be made of steel or a resistant plastic. In particular, the pressure plate 34 can also be made of plastic in case of a plain bearing. To improve the oil flow or to guide oil past a plain bearing or rolling element bearing 36, the pressure plate can also have, e.g., grooves or recesses at its axial end for guiding or channeling oil. Further details of the pressure plate 34 will be described more closely in the following referring to FIG. 3.

When starting by the starting element in FIG. 1, the frictional connection to the driven hub 8 is produced via the impeller blades 20, the turbine blades 22 and the turbine flange 26 of the turbine. After starting, the converter lockup clutch 38 shown in FIG. 1 is hydraulically activated, which produces a frictional engagement between the driven converter cover 14 and an input element 37 of the torsional vibration damper 2.

The input element 37 is disk-shaped in the present instance and is located between a drive-side cover plate 48 and a driven-side cover plate 49 which together form an intermediate transmission arrangement of the torsional vibration damper 2. In case of the two-stage torsional vibration damper 2, the drive-side input element 37 is rotatable around the axis of rotation 10 with respect to the intermediate transmission arrangement against the action of a first spring element arrangement comprising a spring element 40*a*. A disk-shaped output component 42 of the torsional vibration damper 2 is in turn rotatable with respect to the intermediate transmission arrangement against the action of a second spring element arrangement comprising the second spring element 40*b*. The output component 42 is riveted to the driven hub 8 by the first mechanical connection 32 in the form of a rivet connection and is accordingly connected to the driven hub 8 so as to be fixed with respect to rotation relative to it.

For more efficient damping of the rotational irregularities occurring in the drivetrain in converter lockup mode, a mass damper support element 46*a* of a tuned mass damper having at least one damper weight 47 movable with respect to the mass damper support element 46*a* is coupled by a second mechanical connection 44 in the form of a further rivet connection to the intermediate transmission 48, 49 so as to be fixed with respect to rotation relative to it. In this case, the mass damper support element 46*a* extends opposite to the radial direction up to the driven hub 8 and is supported radially thereon. This makes it possible to couple the tuned mass damper 6 with the intermediate transmission arrangement in the manner which is particularly advantageous for compensating torsional vibrations and ensures at the same time that the tilting moments that are possibly introduced into the system through the large masses of the damper weights 47 can be reliably supported. A second mass damper support element 46*b* which is axially adjacent to the first mass damper support element 46*a* and serves to guide the damper weights 47 on the side of the damper weights 47 remote of the first mass damper support element 46*a* is not connected radially inwardly in the embodiment example shown in FIG. 1. Alternatively, for example, as in the embodiment example shown in FIG. 2, the second mass damper support element 46*b* can be guided radially inwardly until it is supported directly at the driven hub 8. In so doing, both mass damper support elements 46*a* and 46*b* can advantageously be connected to the intermediate transmission arrangement by the second mechanical connection 44; that is, in the embodiment examples shown in FIGS. 1 and 2, the mass damper support element 46a and/or mass damper support element 46b are supported via their center bores on the outer diameter of the driven hub 8, which can prevent imbalances in case of an unfavorable arrangement of further bearings or in case of play in the bearings that are employed even when large damper weights 47 are used. However, it is also conceivable alternatively to provide bearing support for the driven-side cover plate 49 of the intermediate transmission 48, 49 on the outer diameter of the driven hub 8 instead of the mass damper support element 46a according to FIG. 1 or mass damper support elements 46a and 46b according to FIG. 2. In an arrangement of this type, the center bore of the mass damper support element 46a and possibly the center bore of mass damper support element 46b are to be formed with a larger inner diameter than the outer diameter of the driven hub 8.

Figure 2:
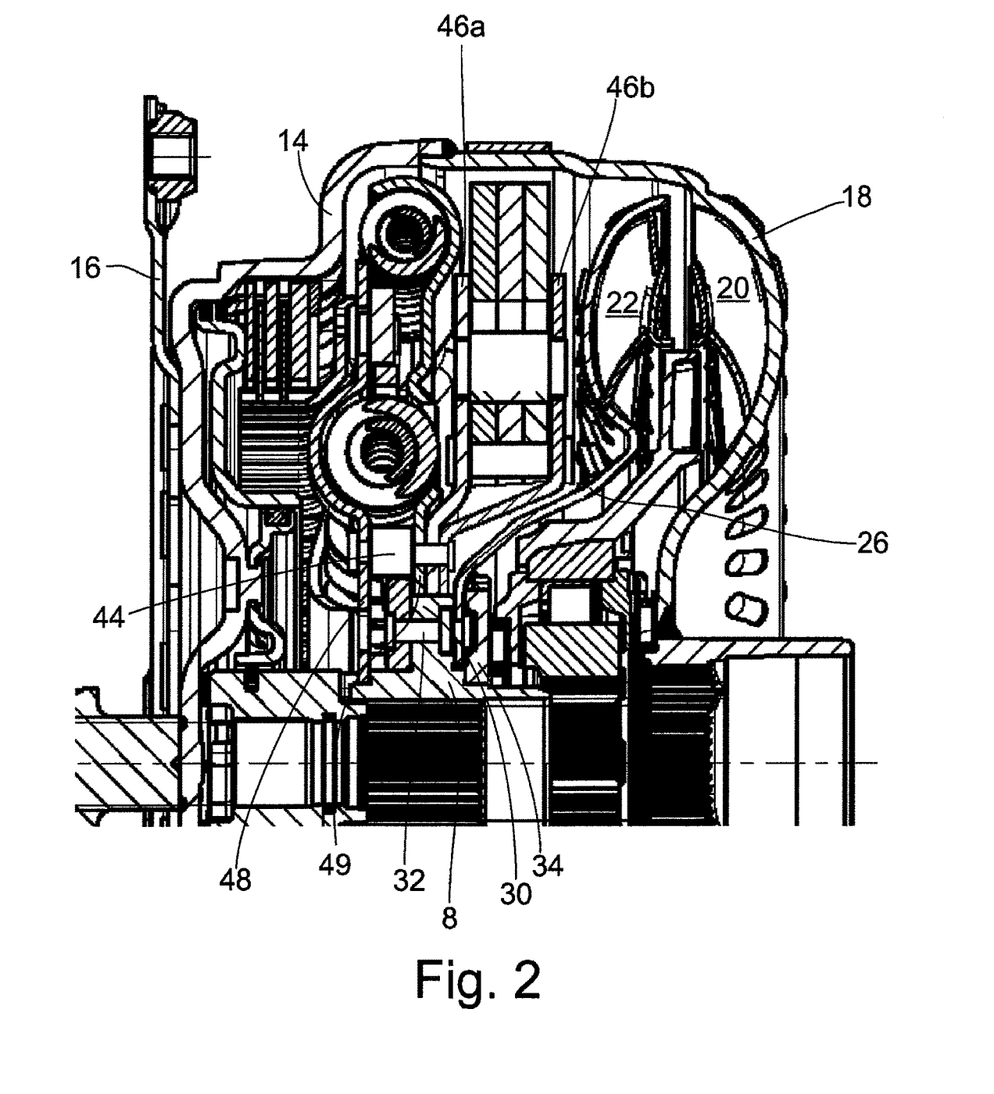
FIG. 2 is a section through one half of a further starting element according to the present invention.

Since the components used in the embodiment example shown in FIG. 2 correspond to those of the embodiment example shown in FIG. 1 with the exception described above, the description of the respective components of the embodiment example in FIG. 1 is referred to for a more detailed description of the embodiment example shown in FIG. 2.

Although a two-stage torsional vibration damper 2 is shown in FIG. 1, it goes without saying that multi-stage torsional vibration dampers can also be used in alternative embodiment forms.

In the embodiment example shown in FIG. 1, the tuned mass damper 6 is riveted to the torsional vibration damper 2 via a mass damper support element 46a extending from the radially outer side to the radially inner side to the driven hub 8. In other words, the first mechanical connection 32 and the second mechanical connection 44 are each formed as rivet connections in the embodiment example illustrated in FIG. 1. Of course, in alternative embodiment examples each connection can be carried out by any type of mechanical fastening.

The radial staggering of the first mechanical connection and second mechanical connection 42 and 44, respectively, which is realized in the embodiment example shown in FIG. 1, both of which first mechanical connection 32 and second mechanical connection 44 are moreover located radially inside of the second spring element 40b of the second spring element arrangement, makes possible a construction which is particularly compact yet robust and which takes into account all of the transmitted torques.

In the embodiment form shown in FIG. 1, the torsional vibration damper 2 that is coupled to the mass damper support element 46a via the second mechanical connection 44 is also supported inwardly in the radial direction 28 on the driven hub 8 by the mass damper support element 46a. In the embodiment example shown in FIG. 1 in which the axial extension of the mass damper support element 46a is greater than that of a driven-side cover plate 49 of the torsional vibration damper 2, this can contribute to a low-wear radial support of the torsional vibration damper 2 with a slight area pressure. Since the damper weights 47 and the mass damper support element 46a can have a large mass depending on function, an efficient support of the tuned mass damper 6 in axial direction 12 and in radial direction 28 is generally desirable when this tuned mass damper 6 is arranged at the intermediate transmission arrangement.

In the embodiment shown in FIG. 1, a drive-side cover plate 48 of the torsional vibration damper 2 also extends inward opposite the radial direction 28 to the driven hub 8 for additional radial support. As a result of this arrangement, a further radial support is formed in axial direction 12 which is spaced apart from the support of the mass damper support element 46a by a large supporting distance. The radial supports that are spaced apart from one another can effectively prevent a tilting of the tuned mass damper 6 with respect to the driven hub 8 even when the damper weights 47 which are radially movable relative to the mass damper support element 46a are axially offset with respect to the radial support of the mass damper support element 46a as is shown in FIG. 1.

In addition, the advantageous shape of the drive-side cover plate 48, which extends radially inward also makes it possible to support the torsional vibration damper 2 in the axial direction 12 and opposite thereto. Together with a guide bush 51 which adjoins the driven hub 8 opposite the axial direction 12, the driven hub 8 forms a retaining area 53 into which the drive-side cover plate 48 extends; that is, the driven hub 8 and the guide bush 51 define an area within which the drive-side cover plate 48 can move in axial direction within a defined play and which inhibits the maximum movability of the drive-side cover plate 48 in the axial direction and opposite thereto. To prevent excessive wear when the drive-side cover plate 48 is axially supported at the driven hub 8, a bearing for the drive-side cover plate 48 is formed at the driven hub 8 in the form of a stop surface 50 extending parallel to the drive-side cover plate 48.

This can serve to prevent the efforts of the torsional vibration damper 2 to move in axial direction 12 that are brought about by reason of axial forces exerted on the cover plate 48 or 49 of the torsional vibration damper 2. As a result of this, the torsional vibration damper 2 can in turn withstand higher loads in the form of friction, deformations, etc., and a limiting of functionality due to axial displacements on adjoining component parts, e.g., the converter lockup clutch 38, can be prevented so that the overall operability can be maintained for a longer period of time without malfunction.

In the embodiment shown in FIG. 2 with a tuned mass damper 6 with two axially spaced mass damper support elements 46a and 46b, the two mass damper support elements 46a and 46b extend inward opposite the radial direction 28 to the driven hub 8, where they are radially supported. This increases the axial extension of the area at which the masses of the tuned mass damper 6 and of the torsional vibration damper 2 are radially supported on the driven hub, which can prevent a tilting of the tuned mass damper 6 with respect to the driven hub without an area pressure in this region leading to excessive wear. In some embodiment examples, therefore, a further radial support of another component part of the tuned mass damper 6 or of the torsional vibration damper 2 can be dispensed with.

In alternative embodiment examples, it is, of course, also possible that further parts of the torsional vibration damper 2 are also themselves supported radially on the driven hub 8. In other words, in an embodiment form of this kind a further component part, i.e., for example the driven-side cover plate 49, the output component 42 or a further intermediate plate between the flexible elements 40a and 40b, could also extend inward in the radial direction to the surface of the driven hub 8 to achieve a support.

In the embodiment example shown in FIG. 1, the movement of the torsional vibration damper 2 in axial direction 12 is accordingly impeded by the stop surface 50 at the driven hub 8, whereas the movement opposite to the axial direction 12 is limited or inhibited by a guide bush 51 connected to the driven hub 8 so as to be fixed with respect to rotation relative to it or by the cover hub. In some embodiment examples, the bearing support between the stop surface 50 and the drive-side cover plate 48 has play so that no increase in friction can come about. Further, axial forces are conducted directly through the axial contact between guide bush 51 and the driven hub 8 without negatively influencing the torsional vibration damper 2.

In alternative embodiment examples, an axial support can also be carried out by an intermediate plate of the torsional vibration damper 2 whose relative movements with respect to the driven hub 8 are smaller, so that possible wear can be further prevented.

Although not shown in the embodiment examples in FIGS. 1 and 2, additional further elements can be installed in a starting element according to an embodiment example of the invention. For example, friction devices for damping vibrations can be incorporated and can be arranged, inter alia, between the drive-side cover plate 48 and the driven hub 8. Alternative arrangements of friction devices of this kind can be arranged, for example, between the drive-side cover plate 48 and the output component 42 of the torsional vibration damper 2 or between the guide bush 51 or a head piece and the drive-side cover plate 48.

The radial staggering of the first mechanical connection 32 and second mechanical connection 44 also makes it possible for the turbine flange 26 of the impeller shell 18 to be shaped in such a way that it extends in the axial direction 12 below the tuned mass damper 6 until terminating at the turbine blades 22. In connection with the radial staggering of the first mechanical connection 32 and second mechanical connection 44 this allows the extremely compact arrangement of the torsional vibration damper 2, tuned mass damper 6 and turbine adjacent to one another in axial direction, which results in a further optimization of the utilization of the available installation space.

FIG. 3 shows a detailed, partially perspective view of the pressure plate 34 used in the embodiment examples in FIGS. 1 and 2 to make the connection of the turbine flange 26 mechanically stable. The pressure plate 34 has a plurality of recesses 52 or bores in the region of the heads of the rivets of the first mechanical connection 32 for receiving the rivet heads. In alternative embodiment examples, a circumferential groove can also be used instead of the plurality of bores. The outer circumference 54a or inner circumference 54b of the pressure plate 34 can serve as contact surface for the turbine flange 26 and/or driven hub 8. In alternative embodiment examples, the driven hub 8 can also have corresponding depressions so that the rivets can be completely recessed axially in the hub and a flat support surface is accordingly formed for the turbine flange 26 of the turbine at the driven hub 8. Axial forces can be supported by the pressure plate 34 without loading the rivet heads. In alternative embodiment examples, the collar-shaped central area of the rivets can also serve as a support for the turbine flange 26 to improve the quality of the first mechanical connection 32 between the turbine flange 26 of the turbine and the driven hub 8.

The pressure plate 34 itself is radially and/or axially centered via the driven hub 8, and the rear side of the pressure plate 34, i.e., the end thereof located in the axial direction 12, is either formed as a plain bearing or serves as a contact surface for a thrust bearing. A thrust bearing of this type can be constructed either as a rolling element bearing, for example, as a thrust needle bearing, or as a separate sliding plate (e.g., of plastic). Further, the pressure plate 34 can have grooves, not shown for the sake of simplicity, for guiding oil.

The pressure plate shown in FIG. 3 is further secured against a relative rotation with respect to the turbine flange 26 of the turbine. Accordingly, relative movements in circumferential direction can only take place at the bearings which are provided for this purpose and which may possibly be specifically designed, i.e., via rolling element bearings or plain bearings which may be installed. A premature wear at the surface contacting the turbine or hub can accordingly be prevented. In the specific embodiment example shown in FIG. 3, the rotational locking is realized by pin-shaped driving elements 56a, 56b, which are formed integral with the pressure plate 34 and which engage in corresponding cutouts or holes in the turbine flange 26. In alternative embodiment examples, the rotational locking can, of course, be implemented by any other known steps.

Particularly in a starting element that has a tuned mass damper 6 between torsional vibration damper 2 and turbine as is shown in FIGS. 1 and 2, the use of a pressure plate 34 can absorb the increased forces or torques resulting at the connection between the turbine flange 26 of the turbine and the driven hub 8. Particularly in an embodiment such as that shown in FIGS. 1 and 2 in which the turbine flange 26 extends not only in radial direction 28 but also in axial direction 12, the additional reduction of the load on the riveted location by means of the pressure plate 34 can substantially increase the stability and longevity of the arrangement.

Of course, embodiment examples of the present invention can be used not only in passenger cars but also in trucks or stationary machinery in which the use of a starting element is necessary or useful and which, beyond this, benefit from the damping of torsional vibrations during operation.

The features disclosed in the preceding description, appended claims and drawings can be significant individually as well as in any combination for implementing the invention in its various embodiments.

The embodiment examples described above only illustrate the principles of the present invention. It will be appreciated that modifications and variations of the arrangements and details described herein will be clear to other skilled persons. Therefore, it is intended that the invention be limited only by the protective scope of the appended patent claims and not by the specific details which were presented with reference to the description and explanation of the embodiment examples.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A starting element comprising:
   a torsional vibration damper configured to be coupled with a drive and having a drive-side input element that is rotatable against an action of a first spring element arrangement around an axis of rotation with respect to an intermediate transmission arrangement, and a driven-side output component that is rotatable against the action of a second spring element arrangement around the axis of rotation with respect to the intermediate transmission arrangement, the driven-side output component is coupled with an output of the starting element to be fixed with respect to rotation relative to it;

a hydrodynamic coupling device having a turbine and a turbine flange connected therewith to be fixed with respect to rotation relative to it, wherein the turbine flange is coupled with the output of the starting element to be fixed with respect to rotation relative to it by a first mechanical connection; and a tuned mass damper having at least one mass damper support element supporting at least one damper weight, the at least one mass damper support element is coupled with the intermediate transmission arrangement to be fixed with respect to rotation relative to it by a second mechanical connection, wherein the output of the starting element is formed by a driven hub, wherein the at least one mass damper support element extends opposite to a radial direction perpendicular to the axis of rotation to a component of the output of the starting element, wherein the intermediate transmission arrangement comprises at least one drive-side cover plate that extends opposite to the radial direction with an axial play into a retaining area between the driven hub and a guide bush that adjoins the driven hub opposite to the axial direction, whereby a movement of the drive-side cover plate one of into and opposite to the axial direction is inhibited.

2. The starting element according to claim 1, wherein the tuned mass damper is arranged in an axial direction parallel to the axis of rotation between the torsional vibration damper and the turbine of the hydrodynamic coupling device.

3. The starting element according to claim 1, wherein the first mechanical connection is located farther radially inward than the second mechanical connection.

4. The starting element according to claim 1, wherein the output component of the torsional vibration damper is coupled with the output of the starting element via the first mechanical connection.

5. The starting element according to claim 1, wherein an axial extension of the first mechanical connection at least partially overlaps with an axial extension of the second mechanical connection.

6. The starting element according to claim 1,
wherein a stop surface extends parallel to the drive-side cover plate at the driven hub in the retaining area,
wherein the stop surface forms a bearing for the drive-side cover plate.

7. The starting element according to claim 1,
wherein the intermediate transmission arrangement further comprises a driven-side cover plate arranged on the side of the drive-side cover plate axially opposed to the output component and connected to the drive-side cover plate,
wherein the driven-side cover plate extends opposite to the radial direction to the driven hub so as to be radially supported thereon.

8. The starting element according to claim 7, wherein one of the at least one mass damper support element and the driven-side cover plate of the intermediate transmission arrangement is centered relative to the output.

9. The starting element according to claim 1, wherein the first mechanical connection and the second mechanical connection are arranged radially inside of the second spring element arrangement.

10. The starting element according to claim 1, wherein the driven hub has a fastening flange that extends in the radial direction and to which the turbine flange of the turbine is connected by the first mechanical connection.

11. The starting element according to claim 10, wherein a pressure plate is arranged at a side of the turbine flange of the turbine opposite the fastening flange in the axial direction, the pressure plate extends opposite to the radial direction directly to the driven hub to be supported thereon.

12. The starting element according to claim 11, wherein an axial play is provided between the pressure plate and the turbine flange.

13. The starting element according to claim 11, wherein the pressure plate has a contact surface for a thrust bearing on the side remote of the turbine flange, the contact surface being formed as one of a race for a rolling element bearing and a sliding surface of a plain bearing.

14. The starting element according to claim 11, wherein the pressure plate has one of a circumferential groove or a plurality of recesses on the side facing the turbine flange for receiving one of rivet heads and screw heads.

15. The starting element according to claim 11, wherein the pressure plate is secured against rotation with respect to at least one of the driven hub and the turbine flange.

16. The starting element according to claim 1, wherein the turbine flange of the turbine extends in axial direction substantially radially inside of the tuned mass damper to turbine blades of the turbine which are arranged in axial direction adjacent to the tuned mass damper.

17. The starting element according to claim 1, wherein one of the at least one mass damper support element and the driven-side cover plate of the intermediate transmission arrangement is centered relative to the output.

18. The starting element according to claim 1, wherein one of the at least one mass damper support element and the driven-side cover plate of the intermediate transmission arrangement is radially supported at the driven hub.

* * * * *